Dec. 24, 1968   D. R. LANDPHAIR   3,417,900
AUTOMATIC PRESSURE COMPENSATING ACCESS
SYSTEM FOR FILLING SEALED
STORAGE STRUCTURE
Filed Oct. 4, 1966

INVENTOR
DONALD R. LANDPHAIR
BY Howard J. Barnett
Attorney 3,417,900
AUTOMATIC PRESSURE COMPENSATING ACCESS SYSTEM FOR FILLING SEALED STORAGE STRUCTURE
Donald R. Landphair, Arlington Heights, Ill., assignor to A. O. Smith Harvestore Products, Inc., Arlington Heights, Ill., a corporation of Delaware
Filed Oct. 4, 1966, Ser. No. 584,197
2 Claims. (Cl. 220—86)

ABSTRACT OF THE DISCLOSURE

A remotely operated, automatic pressure compensating access system for filling a sealed storage structure, and more particularly, to an interlinked door access-exhaust system for a sealed storage structure such as a silo which is kept sealed from the atmosphere, but is loaded with additional perishable materials from time to time from the top. The weight of the material being filled into the top of the structure causes the access-exhaust system to open during filling operations.

---

Figure 1:
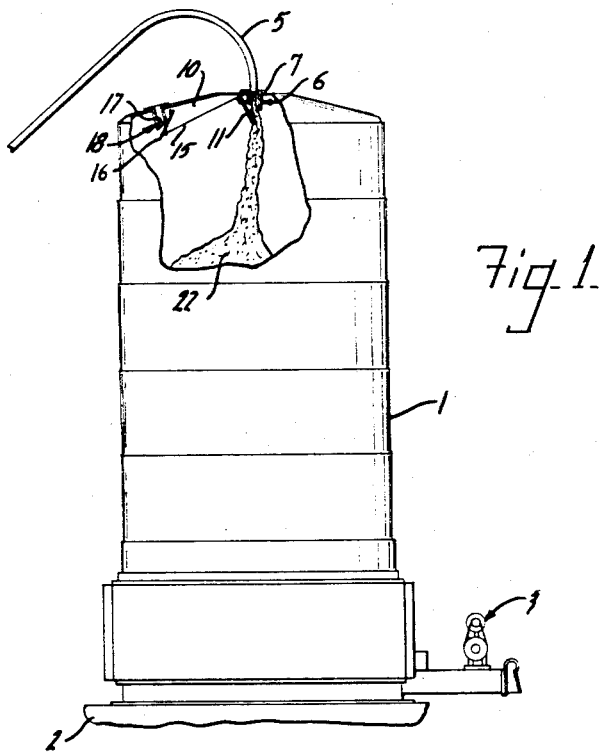

The door system of this invention comprises a filling door, pivotally mounted to normally seal a filling opening in the upper part of the sealed storage structure, and counterbalanced to open in response to filling pressure. The filling door is interconnected to a pivotally mounted exhaust door which normally seals an exhaust opening also disposed in the upper part of the silo. The exhaust door is also counterbalanced and is operated to open and close when the filling door is opened and closed, respectively.

In this way, the storage structure remains sealed from the continued access of outside air, which has a deleterious effect on the stored materials. Contact with the outside air is reduced to that amount which is aspirated in through the filling door during actual filling, because the exhaust door is only open during filling to relieve increased pressure in the structure created by displacement of gases in the structure as it is filled with the material to be stored.

In the past, silos have been constructed with top unloaders, which created a great problem regarding contact with air every time the silo was opened for additional filling or unloading a portion of the stored material. In addition, the most recently added materials were removed first, thus increasing the spoilage rate by delaying the final unloading of the materials in the bottom of the silo. This problem has been largely solved by the use of sealed storage structures having bottom unloaders and breather bag volume compensating systems. However, even with such a system, there is contact with the atmosphere during filling periods, because the practice was to install a bolted access plate in an opening in the top of the silo. This plate had to be removed during each unloading and replaced immediately thereafter, with the added labor of sending a man to the top of the structure (which is sometimes 70 feet high) before and after each filling session to open and close the access opening. This can be annoying procedure, and as a result, is sometimes neglected between loading sessions, thus allowing free contact of the outside air with the stored materials for extended periods of time and thereby defeating the main function of the sealed storage system.

Applicant's invention eliminates the problem of opening and closing the filling opening at the top of a sealed storage structure by providing a filling opening which is sealed by a pivotally mounted, counterbalanced filling door which opens only during actual filling of the storage structure. This filling door is in turn connected to an exhaust door sealing an exhaust opening which opens only when the filling door is open to exhaust displaced gases to the atmosphere. The access system of the invention is applicable to both bottom and top unloading silos, with the greatest benefit obtainable when used in combination with a top loading, bottom unloading structure.

Figure 2:
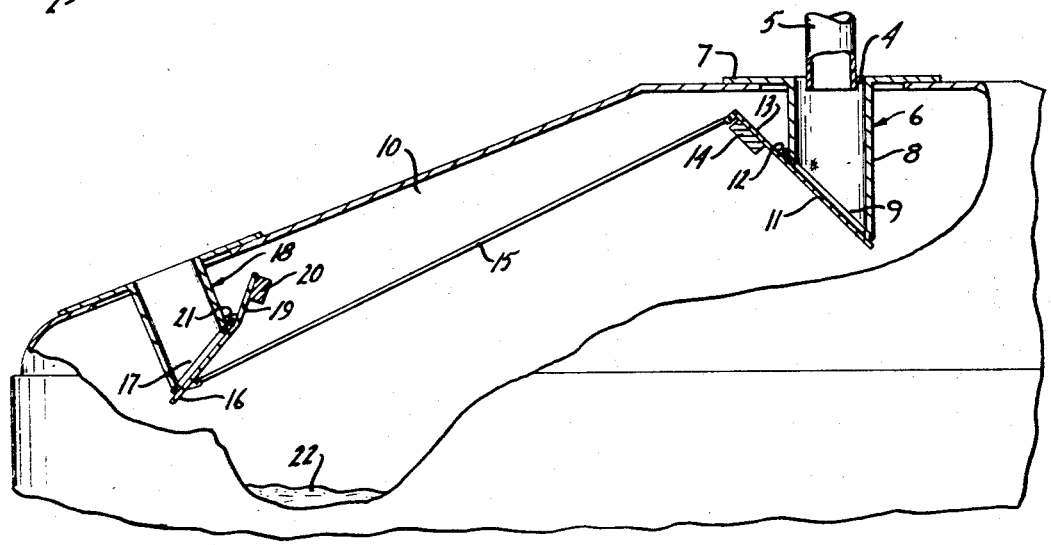

The drawings illustrate the best mode presently contemplated for carrying out the invention:

FIGURE 1 is a side elevation with parts broken away showing the access system installed in a storage structure; and FIG. 2 is an enlarged schematic view of a portion of the structure shown in FIGURE 1 illustrating the interlinked door system in more detail.

As shown in the drawings, a storage structure 1 mounted on a foundation 2 is provided with a bottom unloader 3. An access opening 4 is provided in the top of the structure 1 and is adapted to receive filling conduit 5 therethrough. Opening 4 includes a cylindrical chute member 6 having an integral, annular flange 7 extending perpendicularly out from a vertically disposed cylindrical body member 8.

The bottom end of the body member 8 is cut on a bias, and opening 9 communicating with main storage chamber 10 of the storage structure is closed by a hinged door 11 which pivots downwardly away from the opening 9 on hinges 12. A diagonal extension 13 of the door 11 is provided with a counterweight 14 to keep the door 11 in a normally closed position. The outer end of the door 11 is connected to an operating rod 15 which extends to and connects with a second hinged door 16 disposed over an exhaust opening 17 in the inner end of a second cylindrical body member 18 which is cut on a bias opposite to that of the first body member 8. The second door 16 is also provided with an extension 19, mounting a counterweight 20. The operating rod 15 connects to the lower portion of the door 16, and the door 16 is provided with hinges 21 at the upper inner end of the opening 17. The operating rod 15 opens the second door 16 whenever the door 11 is opened. Door 11 is normally opened upon filling of the storage structure 1 with material 22. As material 22 displaces gases in the main storage chamber 10 of the structure 1, the gases escape through the exhaust opening 17. When filling ceases, the door 11 immediately moves back into position to seal the opening 4 against entry of contaminating air. Simultaneously, the operating rod 15 automatically closes the exhaust opening 17 to thereby completely reseal the chamber 10 from the atmosphere. It can be seen that the access system of the invention is effective for short loading periods as well as long loading periods and is only open while loading of stored materials is actually in progress. The access system operates automatically, and does not require a trip to the top of the storage structure for manual closing.

This invention provides a simple, automatic access system for a storage structure which is operated by a force acting downwardly against the access closure door. This force can be either that of a fluid directed against the door under pressure or the weight of solid material being directed into the storage structure. The access door automatically closes immediately upon termination of the filling operation, and the system is provided with a concurrently actuated exhaust opening which exhausts gases displaced by the material being loaded into the structure.

Various modes of carrying out the invention are contemplated as being within the scope of the following claims particularly pointing out and distinctly claiming the subject matter which is regarded as the invention.

I claim:

1. In a sealed storage structure having a bottom discharge and adapted to be filled from the top with material to be stored, an automatic pressure compensating access system comprising a first access tube extending into the top of the storage structure, a hinged, counterweighted door pivotally connected at the inner end of said access tube to provide a sealing closure therefore, said door being actuatable to open when an external filling force is applied thereto, said filling force being created solely by the weight of the material to be stored conducted through said access tube against the access door, and into said storage structure, an exhaust tube also extending into the top of said storage structure, a second hinged, counterweighted door pivotally connected to the inner end of said exhaust tube to provide a sealing closure therefor, and an operating rod interconnecting said access tube and said exhaust tube to open and close said exhaust tube in response to opening and closing of said access tube, whereby said storage structure is resealed substantially immediately after removal of the external filling force after each filling operation.

2. In a free-standing, sealed storage structure having a base and a top and a vertical height of about 70 feet, and having a top filling opening and a bottom discharge in the base thereof, a remotely operated, automatic pressure compensating filling system comprising a filling tube extending from the vicinity of the base up to the top and into said top filling opening for conducting material to be stored into said structure, a hinged, pivotally mounted, counterweighted filling door disposed at the inner end of the filling opening to provide a sealing closure, said door being so balanced to open in response to the weight of material to be stored being directed against its outer surface, and close again immediately upon cessation of the filling force created solely by the material to be stored, said storage structure also having an exhaust opening in the top thereof, a closure means normally sealing said exhaust opening, and means interconnecting said filling door to said closure means to move the closure means from said exhaust opening when said filling door is open, whereby gases being displaced by the material being filled into said structure are exhausted.

References Cited
UNITED STATES PATENTS

| | | |
|---|---|---|
| 596,244 | 12/1897 | Lied. |
| 608,502 | 8/1898 | Abbee et al. |
| 1,145,252 | 7/1915 | Matthews _____ 137—587 XR |
| 1,531,274 | 3/1925 | Cowden _____ 220—86 |
| 2,771,906 | 11/1956 | Bratfisch et al. ____ 220—86 XR |

RAPHAEL H. SCHWARTZ, *Primary Examiner.*